United States Patent [19]
Fischer

[11] Patent Number: 6,106,055
[45] Date of Patent: Aug. 22, 2000

[54] GRAB HANDLE ASSEMBLY

[75] Inventor: Douglas A. Fischer, Grand Rapids, Mich.

[73] Assignee: Lear Donnelly Overhead Systems L.L.C., Novi, Mich.

[21] Appl. No.: 09/256,410

[22] Filed: Feb. 24, 1999

Related U.S. Application Data

[60] Provisional application No. 60/087,663, Jun. 2, 1998.

[51] Int. Cl.[7] .................................................. B60R 13/00
[52] U.S. Cl. ............................................. 296/214; 16/444
[58] Field of Search ...................... 296/214, 71; 16/444, 16/446, 436, DIG. 40, DIG. 41

[56] References Cited

U.S. PATENT DOCUMENTS

| | | |
|---|---|---|
| 4,357,734 | 11/1982 | Moore . |
| 4,373,229 | 2/1983 | Moore . |
| 4,794,668 | 1/1989 | Lorence et al. . |
| 5,285,551 | 2/1994 | Weiland et al. . |
| 5,440,783 | 8/1995 | Allardyce et al. . |
| 5,519,917 | 5/1996 | Cordonnier . |
| 5,632,061 | 5/1997 | Smith et al. . |
| 5,662,375 | 9/1997 | Adams et al. . |
| 5,855,408 | 1/1999 | Rickabus ................................. 296/214 |
| 5,920,957 | 7/1999 | Wagner ................................... 296/214 |
| 5,975,606 | 11/1999 | Forbes et al. ........................... 296/214 |

Primary Examiner—D. Glenn Dayoan
Assistant Examiner—Patricia Engle
Attorney, Agent, or Firm—Brooks & Kushman P.C.

[57] ABSTRACT

A grab handle assembly for attaching a grab handle to a vehicle roof. The grab handle assembly comprises a mounting clip having a fastener that passes through the aligned openings in the headliner and a vehicle roof bracket to secure the mounting clip to the vehicle roof and to additionally mount the headliner to the vehicle roof. The mounting clip further includes a lug extending downwardly from a lower surface of the mounting clip. The grab handle has opposing ends that terminate in a planar tab with an opening, which is sized to receive the lug. To connect the mounting clip and the grab handle, the lug is inserted through the opening in the grab handle and the mounting clip and grab handle are rotated relative to each other approximately 90° to connect the grab handle and the mounting clip.

18 Claims, 3 Drawing Sheets

GRAB HANDLE ASSEMBLY

CROSS REFERENCE TO RELATED APPLICATION

This application claims the benefit of U.S. Provisional Application No. 60/087,663, filed on Jun. 2, 1998.

BACKGROUND OF THE INVENTION

1. Field of the Invention

The invention relates to a grab handle for a motor vehicle and, more specifically, a grab handle having a locking clip to facilitate the installation of the grab handle into the vehicle.

2. Description of the Related Art

It is common in contemporary vehicles to provide a grab handle or assist handle along the vehicle roof near a door opening, especially along one or more of the non-driver door openings, to aid an occupant of the vehicle in entering and exiting the vehicle. A typical vehicle root construction comprises a metal roof with a roof bracket and a headliner covering the metal roof and bracket in the passenger compartment of the vehicle. The grab handle is mounted to the vehicle roof bracket though the headliner.

There are many different flays currently to mount the grab handle to the vehicle roof bracket. It is always desirable to provide improved grab handles with simplified installation.

SUMMARY OF THE INVENTION

The invention addresses the simplified installation needs with a grab handle assembly comprising a grab handle in combination with a locking clip. The grab handle can be simply and quickly coupled to the locking clip without the need of additional fasteners and the locking clip is adapted to be quickly and simply attached to the vehicle and subsequently locked in place.

According to the invention, a grab handle assembly for mounting to a vehicle roof to a roof bracket accessible within a vehicle passenger compartment is adapted to mount in a vehicle passenger compartment having a headliner positioned adjacent the vehicle roof and having a headliner opening that is complementary to a roof bracket opening. The grab handle assembly comprises at least one mounting clip having a base with opposing upper and lower surfaces. A fastener extends from the upper surface and is adapted to pass through the complementary roof bracket and headliner openings to thereby mount to the vehicle roof bracket. A handle connector is provided on the lower surface of the base. The grab handle assembly further comprises a handle having a body with opposing ends. At least one of the ends terminates in a mounting clip connector. One of the handle connector and the mounting clip connectors defines an opening and the other comprises a projection that is shaped to be received within the opening in a first position and retained within the opening in a second position to thereby connect the handle to the mounting clip.

Preferably, the handle connector is the projection and comprises a lug, having a stem extending from the base lower surface and terminating in an elongated head. The mounting clip connector is a planar tab extending from the handle body and in which is defined the opening. The opening has an elongated shape that is complementary to the head of the lug. The head is received within the opening in the first position and is rotated to a second position where at least a portion of the head overlies the planar tab to connect the handle and the mounting clip. Preferably the lug is rotated from the first position to the second position by rotating the handle approximately 90°.

The grab handle assembly can further include a cover that is removably mounted to the base. The cover has side walls that are positioned on opposite sides of the planar tab and within the planar tab's rotational path when the cover is mounted to the base in order to block rotation of the handle from the second position to the first position to thereby retain the handle in the second position. The cover can further include a closed end extending between the opposing side walls and which is hingedly connected to the base. Additionally, the cover can have an open end opposite the closed end and through which the handle extends when the cover is in the retaining position. Preferably, the cover is secured to the base by one of the cover and base having a resilient flange that is snap-fit about a complementary lip on the other of the cover or base. The cover is sized to completely overlie the base and the planar tab when the cover is in the retaining position to hide the base and planar tab for aesthetics purposes.

The fastener preferably comprises a fixed finger extending upwardly from the base upper surface and terminating in an apex. A resilient finger extends from the apex and terminates in an abutment surface positioned above the base upper surface. The resilient finger will deflect when the fastener is inserted through the roof bracket opening and spring back after insertion so that the abutment surface will overlie a portion of the roof to fasten the mounting clip to the roof. The fixed finger preferably includes a groove sized to receive an edge of the roof bracket opening. Similarly, the abutment surface includes a depending lip adapted to contact an edge of the roof defining the roof bracket opening to limit the outward deflection of the resilient finger when the mounting clip is mounted to the roof.

The mounting clip can further include a pass-through opening disposed beneath the apex in combination with the cover having a locking finger that extends through the pass-through opening and between the fixed finger and the resilient finger when the cover is mounted to the base to prevent the flexing of the resilient finger toward the fixed finger and thereby lock the mounting clip to the vehicle roof. A channel can be formed in the stem in the elongated lug to thereby divide the elongated lug into two opposing lobes and define a path for the locking finger to travel into the pass-through opening as the cover is pivoted from the non-retaining position to the retaining position.

Preferably, the stem has a circular cross section with a diameter less than the width of the elongated opening, to increase the ease of rotating the handle from the first position to the second position. The base can include opposing ribs extending away from the lower surface on opposite sides of the pass-through opening and a planar tab terminates in an upturned flange that is sized to be received between the opposing ribs when the handle is in the second position to further retain the handle in the second position.

DETAILED DESCRIPTION OF THE PREFERRED EMBODIMENTS

Figure 1:
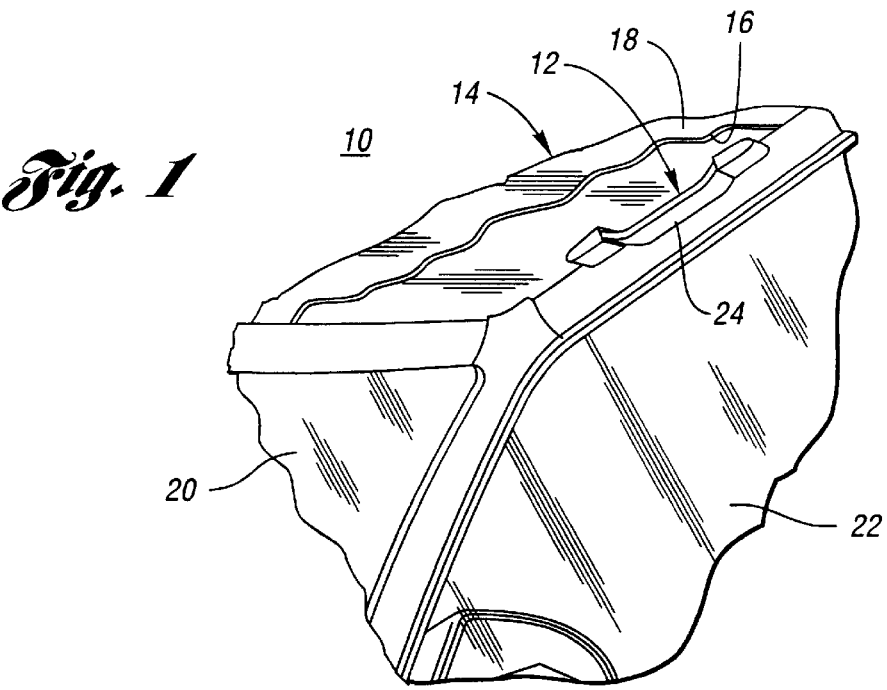
FIG. 1 is a partial perspective view of the interior of a vehicle passenger compartment incorporating a grab handle assembly according to the invention and illustrating the grab handle, spring clip and cover.

FIG. 1 illustrates a portion of the interior of a vehicle passenger compartment 10, which defines the environment of a grab handle assembly 12 according to the invention. The interior of the passenger compartment comprises a vehicle roof 14 having a headliner 16 disposed against a metal roof 18. The roof 14 spans a windshield 20 and a door window 22.

Figure 2:
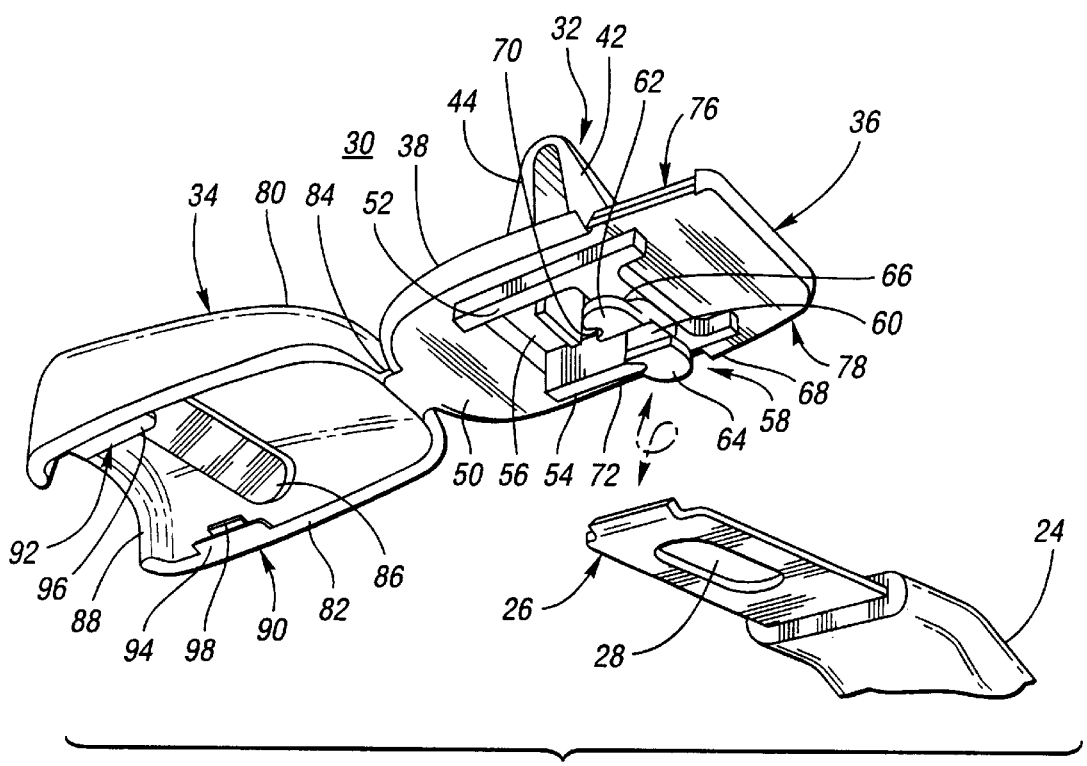
FIG. 2 is an exploded view of the grab handle assembly of FIG. 1 comprising the grab handle assembly and spring clip of FIG. 1

Referring to FIGS. 1–2, the grab handle assembly 12 is mounted to a roof bracket adjacent the door window 22. The grab handle assembly 12 comprises an elongated handle 24 having a body with an arcuate longitudinal cross section and whose ends terminate in mounting tabs 26. Tab 26 includes a connector comprising an elongated locking lug opening 28. Only one of the tabs 26 is shown in the drawings but it is understood that the other end of the grab handle has a similar tab 26.

Figure 5:
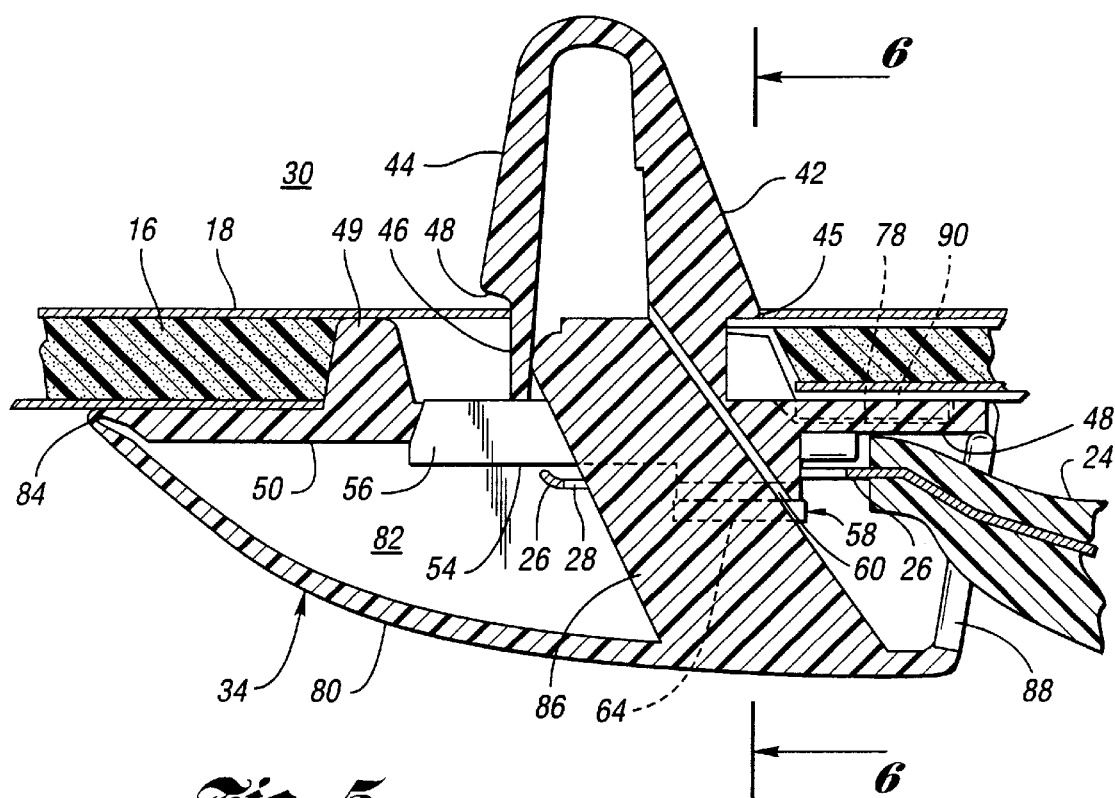
FIG. 5 is a sectional view of the grab handle and spring clip with the cover in a locked position.
Figure 6:
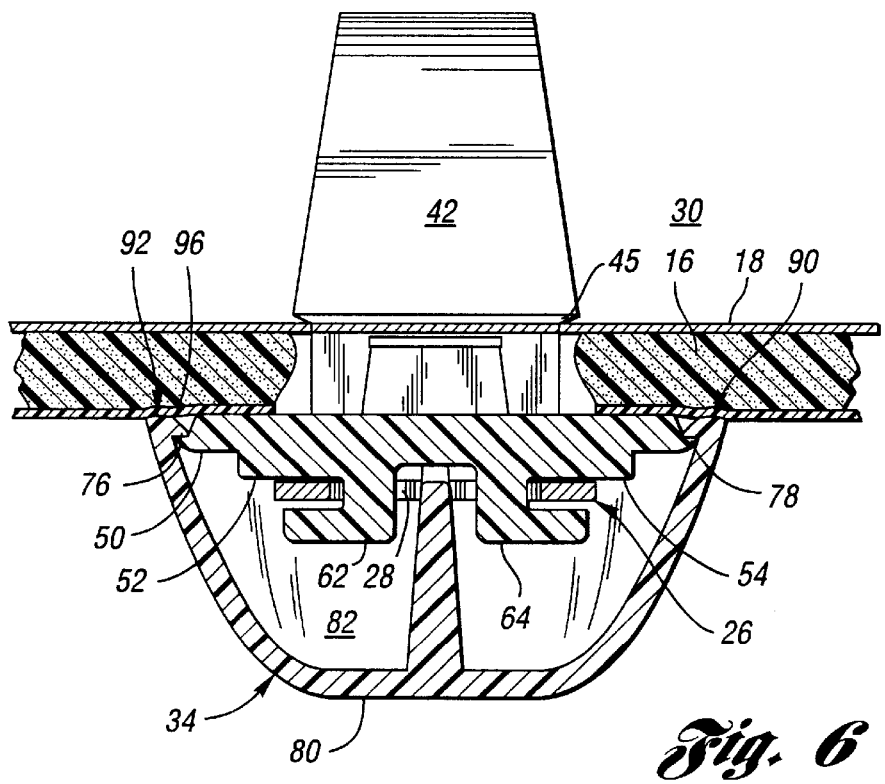
FIG. 6 is a sectional view taken along 6—6 of FIG. 5.

The grab handle assembly 12 further includes a locking clip 30 comprising a spring clip 32 to which is hingedly mounted a retainer comprising a cover 34. The locking clip 30 includes a base 36 having an upper surface 38 from which extends a spring clip 32, which comprises a support arm 42 with a spring finger 44 from which extends a locking tab 46 (FIG. 5). The junction of the locking tab 46 and the spring finger 44 defines a detent 48. A groove 45 is provided on the support arm 42. A spacer 49 extends from the upper surface 38.

The base 36 has a lower surface 50 from which extends support ribs 52 and 54. which border the lateral edges of an opening 56, extending through the base 36. A portion of the locking tab 46 extends into the opening 56. The base 36 has a peripheral edge having reduced thickness portions 76 and 78.

A connector comprising a mounting lug 58 that spans the support ribs 52 and 54 and defines one of the longitudinal rear edges of the opening 56. The mounting lug 58 has a groove 60 extending though its center and into the support arm 42. The groove 60 separates the mounting lug into a first lobe 62 and a second lobe 64. The lobes 62 and 64 are spaced above the support ribs 52 and 54 by a stem to define channels 66 and 68. Each of the lobes 62 and 64 has an inset 70 and 72, respectively.

The locking cover 34 includes a cover housing 80 having an opening 82 that conforms to the shape of the base 36. The cover 80 is connected to the base 36 by a living hinge 84. A locking finger 86 extends from the cover 80 through the opening 82. A grab handle opening 88 is formed in the cover 80 opposite the living, hinge 84 and receives an end of the handle when assembled. A pair of snaps 90 and 92 are provided on opposite sides of the base opening 82 of the cover 80 near the handle opening 88. The location of the snaps 90 and 92 coincided with the location of the reduced thickness portion 76 and 78 when the cover is rotated around the living hinge 84. The snaps 90 and 92 include cam surfaces 94, 96 and stops 98. 100, respectively. The cam surfaces 94. 96 are spaced from their corresponding stops 98. 100 a distance greater than the thickness of the reduced thickness portion 76 and 78.

Figure 3:
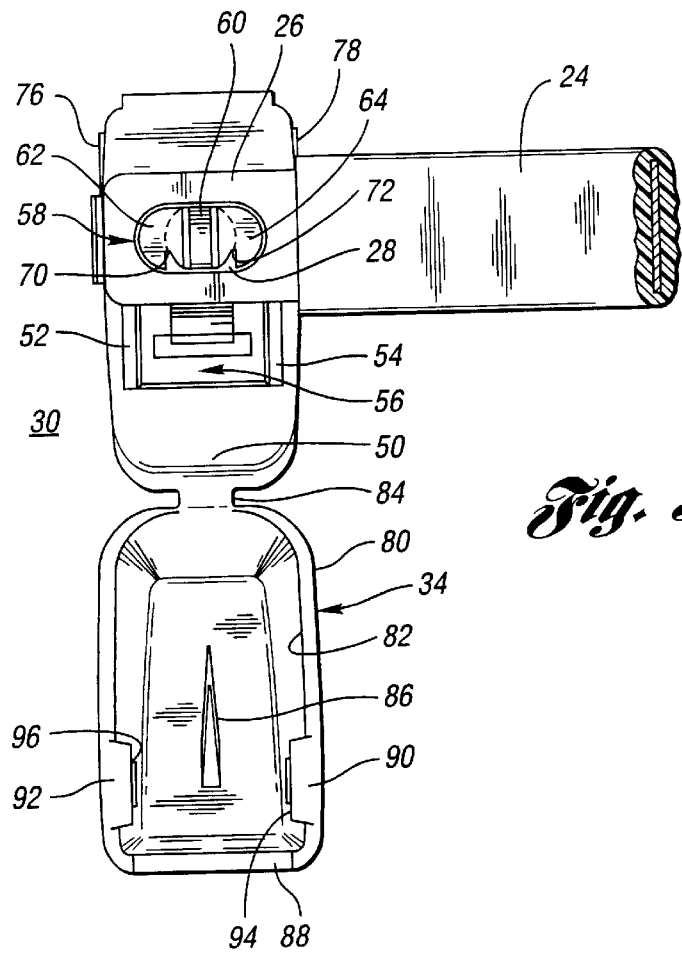
FIG. 3 is a plan view of the grab handle and spring clip in a partially assembled position.
Figure 4:
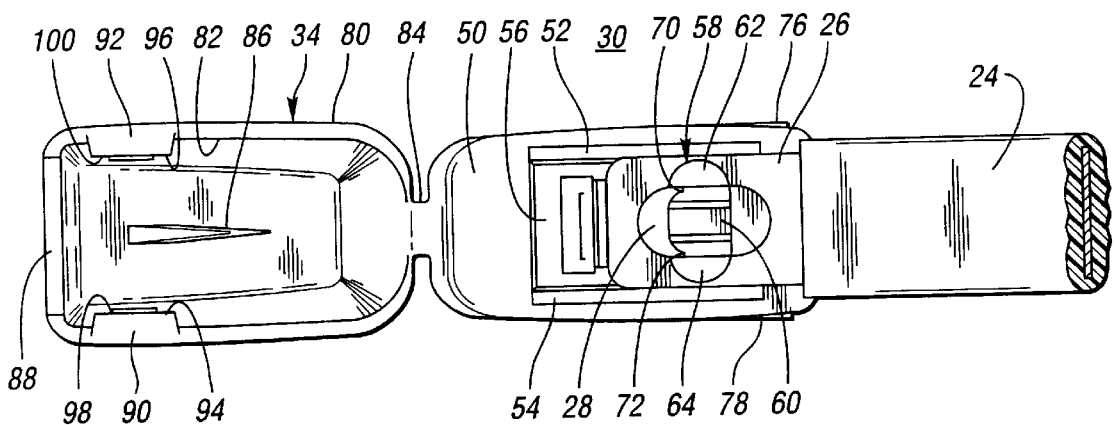
FIG. 4 if a plan view of the grab handle and spring clip in the assembled position.

Referring to FIGS. 3–6, to install the grab handle, the spring clip 32 is first oriented with respect to the grab handle 24 so that the lug 58 can be inserted through the opening 28 in the tab 26 as seen in FIG. 3. In this position, a longitudinal axis defined by the base 36 and the cover 80 is oriented 90° with respect to the longitudinal axis defined by the grab handle 24. The spring clip 32 is then rotated approximately 90° so that the longitudinal axis of the spring, clip aligns with the longitudinal axis of the grab handle. As the spring clip is rotated, the lobes 62 and 64 are rotated under the tab 26, which is received within the channels 66 and 68 between the lobes and the support ribs 52 and 54. In this position, the spring clip 32 is free to slide within the slot 28 but the lobes prevent the spring clip and the grab handle from separating It should be noted that although the rotation of the spring clip is described, the handle could just as easily be rotated with respect to the clip or both the clip and handle can be rotated with respect to each other.

To complete the installation of the grab handle, the spring clip is inserted into a vehicle roof bracket (not shown) by first inserting the spring clip 32 into a corresponding opening in the roof bracket and pressing upwardly, deflecting the spring finger 44 until the detent 48 passes the vehicle roof bracket opening and the roof seats in the groove 45. The resiliency of the spring finger 44 urges the locking tab 46 against the vehicle roof bracket and the detent 48 rests on the upper surface of the vehicle roof bracket and the spacer 49 abuts the passenger compartment side of the roof 18. The cover 80 is then rotated about the living hinge 84. As the cover 80 is rotated, the locking finger 86 passes through the opening 28 in the grab handle tab 26. Through the channel 60 and extends into the space separating the support arm 42 from the spring finger 44 and closely adjacent the spring finger 44. In this position, the locking finger 86 prevents sufficient inward deflection of the spring finger 44 to prevent the unclipping of the spring finger 44 from the vehicle roof bracket. effectively locking the spring finger to the vehicle roof bracket. The locking finger 86 further fills the gap between the lobes 62 and 64 to support the lobes under load and provide a solid structure between the lobes 62. 64 to support the grab handle. The continued rotation of the cover 80 results in the snaps 90 and 92 encountering the reduced thickness portion 76 and 78. As the cover 80 is rotated, the reduced thickness portions are deflected by the cam surfaces 90 92 until they snap into the space between the cam surfaces 90, 92 and the stops 98, 100, effectively locking the cover to the base 36 and concealing the spring clip.

The invention provides a simple and effective connection between the mounting clip and the handle, which aids in the installation of the grab handle. The locking clip can also be used to mount the headliner to the vehicle roof, While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A grab handle assembly for mounting to a vehicle roof through a roof bracket opening accessible within a vehicle passenger compartment having a headliner positioned adjacent the vehicle roof and having a headliner opening complementary to the roof bracket opening, the grab handle assembly comprising;

at least one mounting clip having a base with opposing upper and lower surfaces, a fastener extending from the upper surface and adapted to pass through the complementary roof and headliner openings to mount to the vehicle roof, and a handle connector provided on the lower surface;

a handle comprising a body having opposing ends with at least one of the ends terminating in a mounting clip connector and one of the handle connector and mounting clip connector defines an opening and the other of the handle connector and mounting clip connector comprises a projection shaped to be received within the opening in a first position and retained within the opening in a second position to connect the handle to the mounting clip; and a cover removably mounted to the base and having side walls that are positioned on opposite sides of the mounting clip connector and the handle connector when the handle is in the second position to retain the handle in the second position.

2. A grab handle assembly according to claim 1, wherein the handle connector is the projection and comprises a mounting lug having a stem extending, from the base loafer surface and terminating in an elongated head, the mounting clip connector comprises a planar tab extending, from the handle body and in which is defined the opening which has an elongated shape complementary to the lug head, and the head passes through the opening in the first position and the head is retained in the opening when the head is rotated to a second position where at least a portion of the head overlies the planar tab to connect the handle and the mounting clip.

3. A grab handle assembly according to claim 2, wherein the elongated opening and the handle body have aligned longitudinal axes and the handle is rotated approximately 90° to rotate the lug relative to the opening.

4. A grab handle assembly according to claim 2 and wherin said side walls are positioned on opposite sides of the planar tab within a rotational path of the planar tab when the cover is mounted to the base to prohibit rotation of the handle from the second position to the first position to retain the handle in the second position.

5. A grab handle assembly according to claim 4 wherein the cover has a closed end extending between the opposing side walls and which is hingedly connected to the base and an open end opposite the closed end whereby the cover can be pivoted between a retaining position where the side walls are within the planar tab rotational path and the handle extends out of the open end and a non-retaining position where the side walls are removed from the planar tab rotational path.

6. A grab handle assembly according to claim 5, wherein one of the base and the cover side walls has a resilient flange and the other of the side walls and the base has a complementary lip wherein the resilient lip snaps over the lip to lock the cover in the retaining position.

7. A grab handle assembly according to claim 5, wherein the cover is sized to completely overlie the base and the planar tab when the cover is in the retaining position.

8. A grab handle assembly according to claim 5, wherein fastener comprises a fixed finger extending upwardly from the base upper surface and terminating in an apex and a resilient finger extending from the apex and terminating in an abutment surface positioned above the base upper surface, wherein the resilient finger will deflect when the fastener is inserted through the roof bracket opening and spring back after insertion so that the abutment surface will overlie a portion of the roof to fasten the mounting clip to the roof.

9. A grab handle assembly according to claim 8, wherein the fixed finger includes a groove sized to receive an edge of the roof defining the roof bracket opening and the abutment surface includes a depending lip adapted to abut an edge of the roof bracket opening to limit the outward deflection of the resilient finger when the mounting clip is mounted to the roof bracket.

10. A grab handle assembly according to claim 8, wherein the base has a pass-through opening disposed beneath the apex and the cover has a locking, finger that extends through the pass-through opening and between the fixed finger and the resilient finger when the cover is mounted to the base to block the flexing of the resilient finger toward the fixed finger and thereby lock the mounting clip to the vehicle roof bracket.

11. A grab handle assembly according to claim 10, wherein a channel is formed in the stem and the elongated lug to divide the elongated lug into two opposing lobes and define a path for the locking finger to travel into the pass-through opening as the cover is pivoted from the non-retaining position to the retaining position.

12. A grab handle assembly according to claim 11, wherein the stem has a circular cross section with a diameter less than the width of the elongated opening to increase the ease of rotating the handle from the first position to the second position.

13. A grab handle assembly according to claim 12, wherein the base includes opposing ribs extending away, from the lower surface on opposite sides of the pass-through opening, and the planar tab terminates in an upturned flange that is sized to be received between the opposing, ribs when the handle is in the second position to further retain the handle in the second position.

14. A grab handle assembly according to claim 2, wherein the stem has a circular cross section with a diameter less than the width of the elongated opening to increase the ease of rotating the handle from the first position to the second position.

15. A grab handle assembly according to claim 2, wherein the base includes opposing ribs extending away from the lower surface and the planar tab terminates in an upturned flange that is sized to be received between the opposing ribs when the handle is in the second position to further retain the handle in the second position.

16. A grab handle assembly according to claim 2 and further comprising a second planar tab on the opposite end of the handle body to define a second opening and a second mounting clip having a second mounting lug comprising, a second stem and a second elongated head, with the second head being received with the second opening.

17. A grab handle assembly according to claim 1, wherein the fastener comprises a fixed finger extending upwardly from the base upper surface and terminating in an apex and a resilient locking finger extending from the apex and terminating in an abutment surface positioned above the base upper surface, wherein the resilient locking finger will deflect toward the fixed finger when the fastener is inserted through the roof bracket opening and springs back after insertion so that the abutment surface will overlie a portion of the roof to fasten the mounting clip to the roof.

18. A vehicle headliner assembly comprising;

a headliner for mounting adjacent a vehicle roof and having a headliner opening complementary to a roof bracket opening, a grab handle assembly comprising:

at least one mounting clip having a base greater in size than the headliner opening and with opposing upper and lower surfaces, a fastener extending from the upper surface and a handle connector provided on the lower surface wherein the fastener passes through the complementary roof bracket and headliner openings and the base overlies and covers the headliner opening when the headliner is mounted to the vehicle roof;

a handle comprising a body having opposing ends with at least one of the ends terminating in a mounting clip connector and one of the handle connector and mounting clip connector defines an opening and the other of the handle connector and mounting clip connector comprises a projection shaped to be received within the opening in a first position and retained within the opening in a second position to connect the handle to the mounting clip; and wherein the handle connector is the projection and comprises a lug having a stem extending from the base lower surface and terminating in an elongated head, the mounting clip connector is a planar tab extending from the handle body and in which is defined the opening which has an elongated shape complementary to the lug head, and the head passes through within the opening in the first position and the head is retained behind the opening when the head is rotated to a second position where at least a portion of the head overlies the planar tab to connect the handle and the mounting clip.

* * * * *

UNITED STATES PATENT AND TRADEMARK OFFICE
CERTIFICATE OF CORRECTION

PATENT NO  : 6,106,055
DATED      : August 22, 2000
INVENTOR(S) : DOUGLAS A. FISCHER It is certified that error appears in the above-identified patent and that said Letters Patent are hereby corrected as shown below:

Column 5, Line 12, Claim 1: delete "removably" and insert --movably--.

Column 5, Line 19, Claim 2: delete "loafer" and insert --lower--.

Column 5, Line 34, Claim 4: delete "wherin" and insert --wherein--.

Signed and Sealed this

Twenty-fourth Day of April, 2001

Attest:

NICHOLAS P. GODICI

Attesting Officer

Acting Director of the United States Patent and Trademark Office